United States Patent

Ishigaki et al.

[15] 3,688,129

[45] Aug. 29, 1972

[54] SIGNAL CONTROL CIRCUIT

[72] Inventors: Yoshio Ishigaki; Hajime Shinoda, both of Tokyo, Japan

[73] Assignee: Sony Corporation, Tokyo, Japan

[22] Filed: Aug. 21, 1970

[21] Appl. No.: 65,927

[30] Foreign Application Priority Data

Aug. 26, 1969 Japan ......................44/67767
Aug. 26, 1969 Japan ......................44/67768

[52] U.S. Cl.........307/240, 178/5.4 SY, 178/69.5 CB, 307/270, 330/29, 330/69

[51] Int. Cl........H04m 5/44, H03g 3/30, H03k 17/26

[58] Field of Search......307/237, 239, 260, 264, 270; 328/21, 169, 69; 178/5.4 SD, 5.4 SY, 69.5 CB; 325/478, 480; 330/15, 29, 69

[56] References Cited

UNITED STATES PATENTS 3,135,918 6/1964 Bergson...................330/69 X
2,652,460 9/1953 Wallace, Jr...........307/260 X
3,435,362 3/1969 Pamlenyi......................330/29
2,672,529 3/1954 Villard, Jr.............330/109 X
3,161,045 12/1964 Ames, Jr..................330/30 D
3,323,070 5/1967 Hayes......................330/29 X
3,461,320 8/1969 Eastland..................330/15 X
3,287,574 11/1966 Jenkins..................307/264 X
2,840,726 6/1958 Hamilton...............307/270 X
2,776,334 1/1957 Goldberg.............178/5.4 SY
3,525,052 8/1970 Clark......................328/162 X
3,123,779 3/1964 Stumpers et al.............330/69

*Primary Examiner*—Donald D. Forrer
*Assistant Examiner*—L. N. Anagnos
*Attorney*—Lewis H. Eslinger, Alvin Sinderbrand and Curtis, Morris and Safford

[57] ABSTRACT

A transistorized signal control circuit including a pair of transistors which are connected between both ends of a DC power source in the same conductive direction and a plurality of series-connected resistive elements between a couple of corresponding respective electrodes of the transistors. Input terminals are connected to the other couple of corresponding respective electrodes of the transistors and output terminals are connected to connecting points between the series-connected resistive elements. A signal supplied from the input terminals and derived from the output terminals is controlled its amplitude without being changed its DC voltage level.

2 Claims, 3 Drawing Figures

INVENTOR.
YOSHIO ISHIGAKI
HAJIME SHINODA
BY
ATTORNEYS

INVENTOR.
YOSHIO ISHIGAKI
HAJIME SHINODA
BY
ATTORNEYS

SIGNAL CONTROL CIRCUIT

BACKGROUND OF THE INVENTION

1. Field of the Invention

This invention generally relates to a signal control circuit, and more particularly to a transistorized signal control circuit which controls the amplitude of a signal without changing its DC voltage level.

2. Description of the Prior Art

In a conventional signal control circuit such as a signal attenuator circuit or the like, especially a circuit for controlling only the amplitude of a signal without changing its DC voltage level, first- and second-stage circuits are coupled through a coupling capacitor and the magnitude of a signal to be fed to the second stage is altered by changing the value of a load of the first stage. This necessitates supply of separate bias voltages to active elements of the first and second stages and the use of the coupling capacitor, so that the conventional circuit is not suited for integration.

SUMMARY OF THE INVENTION

In view of the foregoing, the present invention is to provide a novel transistorized signal control circuit.

One object of this invention is to provide a signal control circuit which is simple in construction but is capable to controlling the amplitude of a signal at a desired value while maintaining its DC level at a constant value.

Another object of this invention is to provide a signal control circuit which is well suited for integration.

Namely, in the present invention the output sides of first and second active elements are interconnected through a series circuit consisting of first and second resistors of the same resistance value and a variable resistor; signals of opposite polarities are fed to the input ends of the first and second active elements; output terminals are connected to the connection points of the resistors with the variable resistor; and the variable resistor is adjusted to thereby derive at the output terminals a signal attenuated as desired.

DESCRIPTION OF THE PREFERRED EMBODIMENTS

Figure 1:
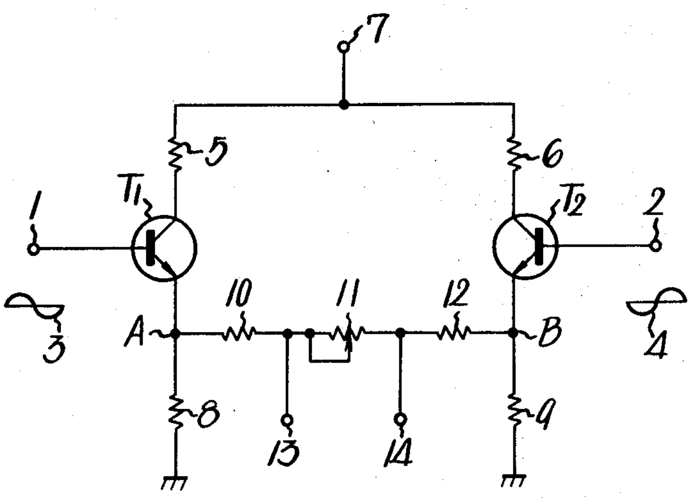
FIG. 1 is a connection diagram showing one example of a signal control circuit of this invention.

With reference to FIG. 1 one example of this invention will hereinafter be described in detail. Reference characters $T_1$ and $T_2$ indicate NPN-type transistors of the same characteristics, whose bases are respectively connected to input terminals 1 and 2. The input terminals 1 and 2 are supplied with AC signals 3 and 4 of opposite side and equal DC levels, the amplitudes of which are to be controlled. For supplying such oppositely phased AC signals to the input terminals 1 and 2, a transformer, a differential amplifier, or another suitable circuit may be employed as a phase inverter circuit. For example, the input terminals 1 and 2 may be connected between the ends of a center-tapped secondary winding of the transformer supplied with an AC signal and the center tap of the secondary winding supplied with a predetermined DC voltage.

Further, the collectors of the transistors $T_1$ and $T_2$ are respectively connected to a power source terminal 7 through resistors 5 and 6, while the emitters of the transistors $T_1$ and $T_2$ are grounded through resistors 8 and 9 of equal resistance value. The transistors $T_1$ and $T_2$ are connected in the emitter-follower form. The common connection point of the emitter of the transistor $T_1$ and the resistor 8 is identified by reference character A and is connected the common connection point B between and the resistor 9 through a series circuit consisting of a resistor 10, a variable resistor 11 and a resistor 12. In this embodiment the resistance values of the resistors 10 and 12 are selected equal to each other. Further, an output terminal 13 is connected to the connection point of the resistor 10 with the variable resistor 11, and another output terminal 14 is connected to the connection point of the resistor 12 with the variable resistor 11.

In the present example the transistors $T_1$ and $T_2$ are operated as emitter-followers with the DC levels of their emitters substantially equal to that of the input AC signal. Consequently, if the AC signals 3 and 4, which are opposite in phase to each other but are at the same predetermined DC level, are applied to the input terminals 1 and 2, the DC level at the connection point A becomes equal to that at the connection point B because the characteristics of the transistors $T_1$ and $T_2$ are equal to each other. Therefore, the DC levels of the outputs derived at the terminals 13 and 14 are also equal to those at the connection points A and B, namely those of the input AC signals 3 and 4 irrespective of the value of the variable resistor 11.

Figure 2:
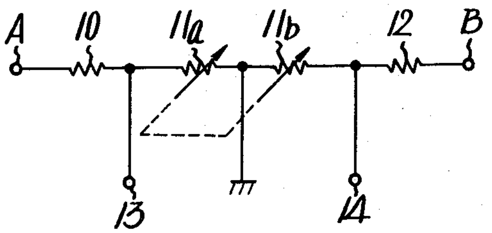
FIG. 2 is a connection diagram showing an equivalent circuit of the signal control circuit of this invention relative to an AC input signal component.

The resistance values of the resistors 10 and 12 are selected equal to each other and the oppositely phased AC signals 3 and 4 are supplied to the connection points A and B, so that the midpoint between the connection points A and B, which is the middle point of the variable resistor 11, is at an apparent zero level point relative to the AC components of the input signals 3 and 4. Accordingly, an equivalent circuit between the connection points A and B with respect to the AC components of the input signals 3 and 4 is as shown in FIG. 2 in which the variable resistor 11 is divided into two variable resistors 11a and 11b which have their sliders ganged together and have equal resistance values. The connection point of the resistors *11a* and *11b* is grounded. Consequently, the AC components of the input signals 3 and 4 appearing at the connection points A and B are divided by the resistors 10 and 12 and the variable resistors 11a and 11b and are supplied to the output terminals 13 and 14, so that, by adjusting the variable sections *11a* and *11b*, of the resistor 11, the amplitudes of the signals derived from the output terminals 13 and 14 can be changed to a desired value. Thus, the amplitudes of the input AC signals 3 and 4 fed to the terminals 1 and 2 can be altered by adjusting the variable resistor 11 to a desired value while maintaining their DC levels at a constant value.

As will be seen from the foregoing, the present invention provides an attenuator circuit which is simple in construction and suited for manufacture as an integrated circuit because of nonuse of capacitor elements.

While the present invention has been described in the in connection with the case where the NPN-type transistors are used in a emitter-follower circuit, these transistors may be used in other circuits or may be replaced with PNP-type transistors. Further, it will be seen that other active elements such as field effect transistors may be employed.

Figure 3:
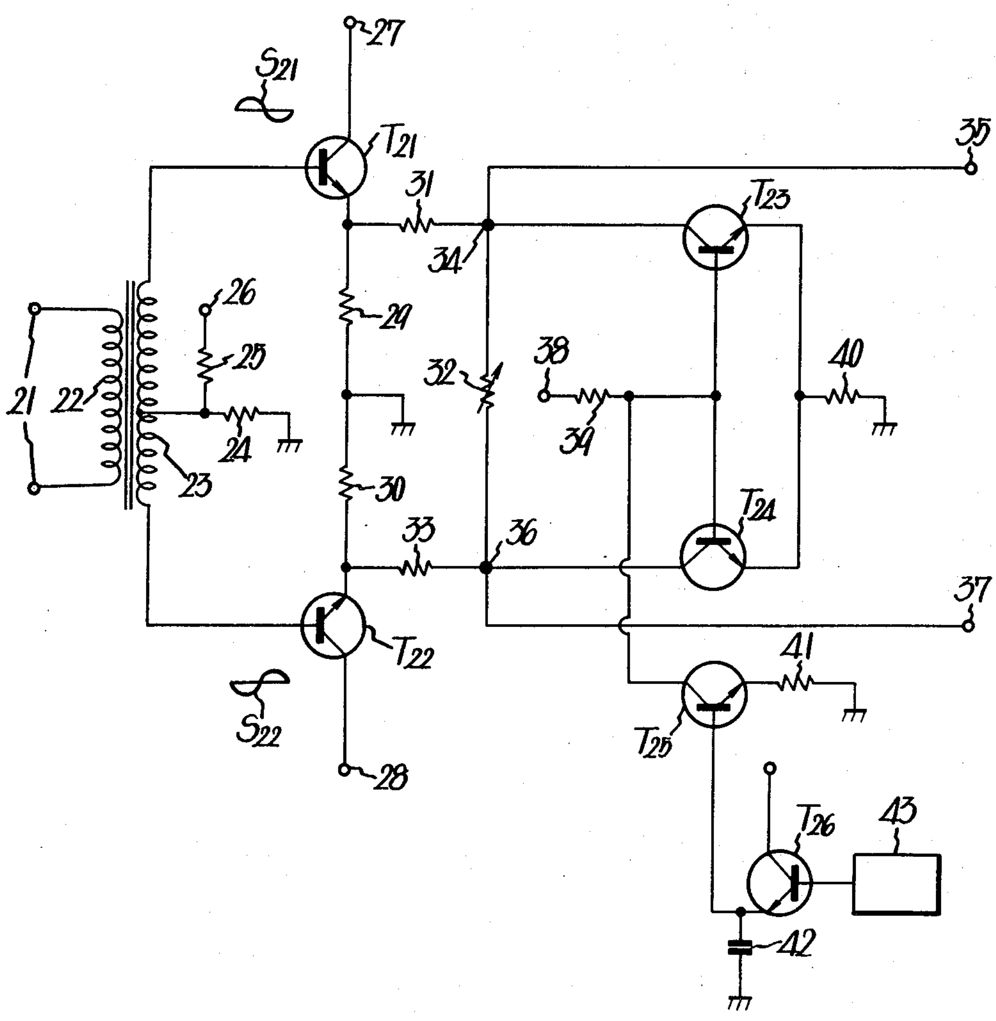
FIG. 3 is a connection diagram illustrating a modified form of the signal control circuit of this invention as being applied to a color television receiver.

Referring now to FIG. 3, the present invention will herein below be described as being applied to a color control circuit for color television receivers. Reference numeral 21 indicates input terminals supplied with a color signal from a band-pass amplifier circuit. The input terminals 21 are connected to a primary winding 22 of a transformer, whose secondary winding 23 is connected at one end to the base of a first npn-type transistor $T_{21}$ and at the other end to the base of a second NPN-type transistor $T_{22}$ of the same characteristics as those of the transistor $T_{21}$. In this case, a center tap of the secondary winding 23 is grounded through a resistor 24 and the connection point of the center tap with the resistor 24 is connected to a power source terminal 26 through a resistor 25. In this way the color signals from the input terminals 21 are changed into color signals $S_{21}$ and $S_{22}$ of a predetermined DC level and these color signals $S_{21}$ and $S_{22}$ are supplied to the transistors $T_{21}$ and $T_{22}$. Further, the collectors of the transistors $T_{21}$ and $T_{22}$ are respectively connected to power source terminals 27 and 28 and the emitters of the transistors $T_{21}$ and $T_{22}$ are grounded through resistors 29 and 30 of equal resistance values respectively, so that the transistors $T_{21}$ and $T_{22}$ are connected as emitter-followers. The emitter of the transistor $T_{21}$ is connected to the emitter of the second transistor $T_{22}$ through a series circuit consisting of a first resistor 31, a variable resistor 32 and a second resistor 33 having a resistance value equal to that of the first resistor 31. In addition, a connection point 34 of the resistor 31 with the variable resistor 32 is connected to an output terminal 35 and a connection point 36 of the variable resistor 32 with the resistor 33 is similarly connected to an output terminal 37. These output terminals 35 and 37 are connected to a circuit to be supplied with the signals, such as a color demodulator (not shown).

The connection point 34 is connected to the collector of an NPN-type transistor $T_{23}$ that serves as a first switching element, and the connection point 36 is likewise connected to the collector of an NPN-type transistor $T_{24}$ which has characteristics that match those of the transistor $T_{23}$ and serves as a second switching element. The bases of the transistors $T_{23}$ and $T_{24}$ are interconnected and are connected to a power source terminal 38 through a resistor 39. The emitters of the transistors $T_{23}$ and $T_{24}$ are interconnected and are grounded through a resistor 40. The connection point of the bases of the transistors $T_{23}$ and $T_{24}$ with the resistor 39 is connected to the collector of an npn-type transistor $T_{25}$, the emitter of which is grounded through a resistor 41 and the base of which is connected to the emitter of an npn-type transistor $T_{26}$. The emitter of the transistor $T_{26}$ is grounded through a capacitor 42. The base of the transistor $T_{26}$ is supplied with a burst signal separated by a burst signal separator circuit 43. The transistor $T_{26}$ and the capacitor 42 constitute a peak detector circuit, which detects the burst signal at its peak value and supplies the detected output to the base of the transistor $T_{25}$. A voltage to be supplied to the power source terminal 38 is selected to be of such a value that the transistors $T_{23}$ and $T_{24}$ become saturated while the transistor $T_{25}$ is in the off state.

With an arrangement as above described, when the burst signal separated by the burst signal separator circuit 43 is detected at its peak value and is applied to the base of the transistor $T_{25}$ , the transistor $T_{25}$ becomes conductive. Accordingly the base potentials of the transistors $T_{23}$ and $T_{24}$ are reduced substantially to the ground potential and are cut off. In this case, since the characteristics of the transistors $T_{21}$ and $T_{22}$ are equal to each other, the DC levels at the connection points 34 and 36 become equal to each other and the mid point between the connection points 34 and 36 serves as an apparent zero level point relative to the AC components of the color signals $S_{21}$ and $S_{22}$. Consequently, the color signals having a predetermined DC level and controlled by the variable resistor 32 at a predetermined value can be supplied to the color demodulator of the subsequent stage through the output terminals 35 and 37.

In the absence of the burst signal, the transistor $T_{25}$ is cut off but the transistors $T_{23}$ and $T_{24}$ conduct and remain saturated. Generally, the impedance between the collector and emitter of the transistor in the saturation region is very small, so that signals appearing at the connection points 34 and 36 flow to ground through the transistors $T_{23}$ and $T_{24}$ and this is equivalent to short-circuiting of the output terminals 35 and 37. Accordingly, no color signals is applied to the color demodulator. In this case, the DC levels at the output terminals 35 and 37 are substantially equal to the ground potential.

With the use of this invention in the color television receiver, it is possible to prevent supply of a color signal to the color demodulator during reception of a monochrome television signal and to ensure color elimination because the DC potentials at the output terminals 35 and 37 have such a value as to prevent normal demodulating operation of the color demodulator in the above case. Further, the level of the color signal can be adjusted by the variable resistor 32 at a predetermined value.

Although the present invention has been described as being applied to a color television receiver, the invention is not limited specifically thereto and may be applied to other various circuits of this type.

It will be apparent that many modifications and variations may be effected without departing from the scope of the novel concepts of this invention.

We claim as our invention:

1. A transistorized signal control circuit for controlling the amplitude of a signal without changing its DC voltage level, comprising a pair of transistors of substantially equal characteristics and each having first, second and third electrodes, means connecting said first and second electrodes of each of said transistors across a DC voltage source in the same conductive direction, means for receiving the input signal to be controlled and supplying said input signal to said third electrode of each of said transistors with the phase of said input signal thus supplied to one of said transistors being opposite to the phase of said input signal supplied to the other of said transistors, a plurality of series-connected resistive elements connected between said second electrodes of said pair of transistors and including an intermediate variable resistive element, and a pair of output terminals connected with said series-connected resistive elements at opposite sides of said variable resistive element, switching means connected between ground and the connection of each of said output terminals with said series-connected resistive elements, and control means controlling said switching means for selectively causing short-circuiting of said output terminals.

2. A transistorized signal control circuit according to claim 1, in which said input signal is a television signal, and said control means controls said switching means in accordance with the presence of a color video signal in said television signal.

* * * * *